US010873397B2

(12) United States Patent
Haas et al.

(10) Patent No.: US 10,873,397 B2
(45) Date of Patent: Dec. 22, 2020

(54) LIGHTING SYSTEM WITH VLC DATA TRANSFER AND METHOD

(71) Applicant: OSRAM GmbH, Munich (DE)

(72) Inventors: Norbert Haas, Langenau (DE); Norbert Magg, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/595,508

(22) Filed: Oct. 8, 2019

(65) Prior Publication Data

US 2020/0112368 A1 Apr. 9, 2020

(30) Foreign Application Priority Data

Oct. 8, 2018 (DE) .................. 10 2018 217 148

(51) Int. Cl.
*H04B 10/00* (2013.01)
*H04B 10/116* (2013.01)
*H04B 10/114* (2013.01)
*H04B 10/40* (2013.01)

(52) U.S. Cl.
CPC ....... *H04B 10/116* (2013.01); *H04B 10/1143* (2013.01); *H04B 10/40* (2013.01)

(58) Field of Classification Search
CPC .. H04B 10/116; H04B 10/1143; H04B 10/40; H04B 10/11; H04B 10/1149; H04B 1/385; H04B 2001/3866; G01B 11/002; H04W 4/029
USPC .................. 398/172, 118, 128–131
See application file for complete search history.

(56) References Cited

U.S. PATENT DOCUMENTS

| 8,934,784 | B2 * | 1/2015 | Guo | G01C 15/002 |
| | | | | 398/172 |
| 9,407,367 | B2 * | 8/2016 | Guo | H04B 10/116 |
| 9,602,205 | B2 * | 3/2017 | Wu | H04B 10/116 |
| 10,187,163 | B2 * | 1/2019 | Breuer | H04B 10/80 |
| 10,447,395 | B2 * | 10/2019 | Olsen | H04B 10/116 |
| 10,498,445 | B1 * | 12/2019 | Olsen | G06Q 30/0623 |
| 10,707,960 | B2 * | 7/2020 | Olsen | G06Q 30/0639 |
| 2007/0146126 | A1 | 6/2007 | Wang | |
| 2007/0147843 | A1 * | 6/2007 | Fujiwara | H04B 10/116 |
| | | | | 398/118 |
| 2008/0094244 | A1 * | 4/2008 | Oh | H04M 1/7253 |
| | | | | 340/815.45 |
| 2008/0131140 | A1 * | 6/2008 | Shin | H04B 10/116 |
| | | | | 398/172 |

(Continued)

FOREIGN PATENT DOCUMENTS

DE 102014202445 A1 8/2015

OTHER PUBLICATIONS

German search report issued for corresponding German patent application DE10 2018 217 148.3 dated May 23, 2019, 9 pages (for information purpose only).

*Primary Examiner* — Hibret A Woldekidan
(74) *Attorney, Agent, or Firm* — Viering, Jentschura & Partner MBB (57) ABSTRACT

In various embodiments, a lighting system is provided. The lighting system includes at least two visual light communication units (VLC units), and at least one effect luminaire, at which one of the VLC units is provided. The further VLC unit is arrangeable at an object. At least one item of state information of at least one of the object or the effect luminaire is transferable between the VLC units by at least one light signal.

13 Claims, 2 Drawing Sheets

(56) References Cited

U.S. PATENT DOCUMENTS

| | | | |
|---|---|---|---|
| 2009/0123156 A1* | 5/2009 | Son | H04B 10/116 398/119 |
| 2011/0002695 A1* | 1/2011 | Choi | H04B 10/116 398/155 |
| 2011/0064416 A1* | 3/2011 | Rajagopal | H04B 10/116 398/130 |
| 2011/0243570 A1* | 10/2011 | Kim | H04W 52/0267 398/140 |
| 2015/0287110 A1* | 10/2015 | Paolini | H05B 47/18 705/26.1 |
| 2015/0373503 A1* | 12/2015 | Jovicic | G01S 5/0252 455/456.1 |
| 2016/0353557 A1 | 12/2016 | Siegel et al. | |
| 2017/0318212 A1* | 11/2017 | Oshima | H04N 5/243 |
| 2017/0351946 A1* | 12/2017 | Jayawardena | G06K 19/0728 |
| 2018/0254835 A1* | 9/2018 | Breuer | H05B 45/00 |
| 2020/0109826 A1* | 4/2020 | Haas | F21L 2/00 |
| 2020/0184153 A1* | 6/2020 | Bongartz | G05B 15/02 |

* cited by examiner

LIGHTING SYSTEM WITH VLC DATA TRANSFER AND METHOD

CROSS-REFERENCE TO RELATED APPLICATION

This application claims priority to German Patent Application Serial No. 10 2018 217 148.3, which was filed Oct. 8, 2018, and is incorporated herein by reference in its entirety.

TECHNICAL FIELD

Various embodiments relate generally to a lighting system including at least two VLC units and at least one effect luminaire, and to a method for transferring and/or for exchanging data.

BACKGROUND

Conventional effect luminaires are used for generating light effects, but also for the targeted illumination of stage regions and/or for illuminating a person and/or an object. If the position of the person or of the object is altered, then the effect luminaire can be aligned such that it follows the movement of the object or of the person. In this case, movement of the effect luminaire can be for example pivoting of a movable luminaire head of the effect luminaire or of a moving head in all spatial directions and/or linear displacement of the effect luminaire on, for example, a guide rail on which the effect luminaire is arranged. In this case, movement of the effect luminaire can be carried out manually by an operator. Said operator must be situated in the vicinity of the effect luminaire in order to be able to move the latter. However, this means a high outlay in terms of personnel and if the effect luminaires are fitted at inaccessible locations, it can happen that they cannot be reached by an operator. Optimum illumination by the effect luminaire additionally necessitates the rehearsal of an exact sequence of movements beforehand in order that the operator can follow the movement of the person on the stage. An improvised movement of the person on the stage can result in the person not being illuminated. A further possibility for moving the effect luminaire is manual operation by a control element. Said control element can be a servomotor, for example, which is controlled by an operating device, for example an operating console, with the result that a high outlay in terms of personnel remains in this case as well. Furthermore, in the meantime the movement of the effect luminaire can now also be carried out fully automatically. For this purpose, the movement of an object and/or a person, for example, is detected by a radio-technological means, for example, and the effect luminaire is then aligned. In the case of this real-time position detection system, the moved object and/or the person have/has a transmitting unit and/or a transponder. The radio signals output by the transponders and/or transmitting units are detected and evaluated by base stations arranged around the region to be observed. This is also referred to as a local position measurement system (LPM system). A further possibility for determining the position is an optical system, for example a light detection and ranging system (LiDAR system), which tracks the objects and the persons by a camera system. This system operates in a similar manner to the LPM system. It emits laser light and evaluates the laser radiation reflected from the objects and/or persons in order to determine the position of the object and/or of the person. What is disadvantageous about the LiDAR system and the LPM system is that a "shadow" can arise behind the object and/or the person, as viewed from the direction of the detection unit of the LiDAR or LPM system, which shadow cannot be detected by the radio waves or the laser. Consequently, an accurate determination of the position usually necessitates at least two stations for transmitting radio signals or laser radiation, which transmitting stations detect the region to be monitored from different viewing angles. An overlap situation in which a shadow can arise can thus be precluded. However, a mix-up of the objects and/or of the persons can take place since the systems cannot unambiguously determine different objects and/or persons. In other words, if two persons are standing one closely behind the other, for example, then unambiguous identification by the system is not possible, and when the persons separate after the overlap situation, a mix-up can occur.

SUMMARY

In various embodiments, a lighting system is provided. The lighting system includes at least two visual light communication units (VLC units), and at least one effect luminaire, at which one of the VLC units is provided. The further VLC unit is arrangeable at an object. At least one item of state information of at least one of the object or the effect luminaire is transferable between the VLC units by at least one light signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments provide a lighting system including e.g. at least two visual light communication units (VLC units). VLC units can communicate with one another by means of visible light and thus transfer data. Furthermore, the lighting system may include at least one effect luminaire. One of the VLC units can be connected to the effect luminaire. In this case, the VLC unit can be directly fitted to the effect luminaire, or else connected thereto. The VLC unit can be fitted e.g. to the base of the effect luminaire. However, it is also conceivable for the VLC unit to be fitted to a movable luminaire head of the effect luminaire. The further VLC unit can be arrangeable or securable at an object, which is movable, for example. The VLC units arranged at the object and at the effect luminaire can communicate with one another by means of at least one light signal and thus exchange at least one item of state information, for example the position of the object, with one another and/or the light signal can be transmitted at least from one VLC unit to the other VLC unit. If provision is also made of at least one further third VLC unit, which is arrangeable for example at a further object or a further effect luminaire, this gives rise to a network of VLC units which can interchange among one another state information from the object or the plurality of objects and/or from the effect luminaire or the plurality of effect luminaires. It goes without saying that two VLC units can also form a network. In other words, it is possible for a lighting system to be provided which includes one or a plurality of effect luminaire(s) connected to one or a respective VLC unit and includes one or a plurality of object(s) and/or person(s) having one or a respective VLC unit.

In various embodiments, the object or the plurality of objects and/or the effect luminaire or at least one portion of the effect luminaires can communicate with one another via the respective VLC units, e.g. multidirectionally. In other words, items of state information, which are for example operating states of the effect luminaire or of at least one portion of the effect luminaires and/or of a controllable element of the object or of a plurality of objects, can be exchanged between the VLC units such that all the VLC units equally acquire and send items of state information. This is possible since the VLC communication has a very high data transfer rate. Many items of information can thus be transferred simultaneously. A further effect of various embodiments may be that two persons can communicate with one another for example by means of the VLC units. For this purpose, both persons can have a VLC unit. One person can transmit a light signal by means of the VLC unit to the VLC unit of the other person, who may be on a stage. This can be provided since, as a result, for example, the person on a stage can acquire a stage direction by means of, for example, an acoustic signal and/or a vibration signal, activated by a light signal received by the VLC unit, without this being noticed by the audience. For this purpose, a VLC unit is connected to a communication unit which can vibrate, for example, or which is connected to means for vibration. A further possibility would be that the person who gives the stage direction for example can also communicate with the effect luminaire or at least one portion of the effect luminaires and the respective effect luminaire or the effect luminaire can provide for the person on the stage, by means of a specific light signal, stage instructions, markings and/or other symbols, e.g. on the stage floor. This can serve for example for orientation assistance.

In various embodiments, at least one VLC unit can be connected to a control device and/or an operating device. This may be provided since the effect luminaire or at least one portion of the effect luminaires can thus be controlled by means of the VLC units. In other words, by way of example, a color change of the or of the respective or of at least one portion of the effect luminaire(s) can be brought about by means of a control signal which is transmitted by the control device and/or operating device via a VLC unit and is received by the VLC unit of the or of the respective or at least one portion of the effect luminaire(s). In various embodiments, it may additionally be provided that the VLC units can additionally also communicate control signals besides the items of state information. In other words, it may be provided that the VLC units can be utilized both for transferring information and for controlling the lighting system.

The VLC unit may include a VLC transmitting unit for transmitting light signals and/or a VLC receiving unit for receiving light signals. In other words, there is the possibility that a VLC unit has only a VLC transmitting unit or a VLC receiving unit or else that the VLC unit includes both a VLC transmitting unit and a VLC receiving unit. This may be provided since it is thus possible to provide a network in which a plurality of VLC units can communicate with one another. By way of example, the or the respective effect luminaire may include only a VLC receiving unit since it thus reacts for example to the items of state information transmitted for example by the VLC transmitting unit of the VLC unit of the object or of the respective object. Costs can thus be saved. There is thus the possibility of setting up different networks. It is conceivable to set up a network in which one or the effect luminaire communicates unidirectionally with exactly one or the object. That means that the respective object has a VLC unit including at least a VLC transmitting unit and the respective effect luminaire has a VLC unit including at least a VLC receiving unit. It is also possible for a plurality of objects to communicate unidirectionally with a respective or the effect luminaire and/or for one or the effect luminaire to be assigned to exactly one or the object. In a further configurational possibility, the effect luminaire or at least one portion of the effect luminaires communicates with at least one or the object bidirectionally, that is to say that both include a VLC unit, which may include both a VLC transmitting unit and a VLC receiving unit.

The bidirectional communication makes it possible, for example, that the object or the respective object, which may include the controllable element or a controllable means, for example a servomotor, is controlled by a signal, for example a control signal, which is transmitted by the VLC unit of the effect luminaire or of the respective effect luminaire. It is also possible, for example, for the VLC unit arranged at the object or the respective object having the means, e.g. having the servomotor, to receive state information of the effect luminaire or of the respective effect luminaire, for example the hue of the emitted radiation, transmitted by the VLC unit of the effect luminaire or of the respective effect luminaire. This can result for example in an adjustment of the controllable means, that is to say for example of the servomotor, of the object or of the respective object. The VLC unit of the object or of the respective object can thereupon transmit state information concerning the controllable means, for example the position of the servomotor, to the VLC unit of the effect luminaire or of the respective effect luminaire. The latter can in turn adapt for example a movement of the effect luminaire or of the respective effect luminaire to the received state information if the object moves for example as a result of the adjustment of the servomotor.

The VLC transmitting unit of the VLC unit or of the respective VLC unit may include at least one sensor unit and/or be connected to a sensor unit, for detecting the state information of the object or of the effect luminaire. If the VLC unit is arranged at a movable object, for example, then the sensor unit can detect position data, for example. The sensor unit, which is a GPS sensor, for example, can be arranged e.g. directly at the object. In a further exemplary configuration, it is possible for an external VLC unit, which is not arranged at the object and which includes a sensor unit, alternatively or additionally to detect position data of the movable object, for example by virtue of the sensor unit being configured as a light detection and ranging system (LiDAR system). The sensor unit, which for example can be arranged at the VLC unit of the effect luminaire or of the respective effect luminaire or can be connected thereto, can for example detect the direction in which the emitted light of the effect luminaire radiates, that is to say determine the position data of the movable luminaire head. Furthermore, the sensor unit can also determine the position data of the effect luminaire if the latter is arranged movably on a rail, for example.

Alternatively or additionally, the VLC unit with VLC transmitting unit may include a controller and/or be connected to a controller which encodes the state information and/or the control signal and modulates the light signal. Possible modulation technologies here are, for example, parts high modulation, parts wide modulation, amplitude modulation, frequency modulation, pulse code modulation, variable pulse position modulation, color code modulation or chromaticity coordinate modulation.

Furthermore, the VLC unit may include an energy store and/or is connected to an energy store, e.g. if said VLC unit cannot be connected to an energy source and is secured to an object, for example. This may be provided since the lighting system can thus be fashioned flexibly.

Furthermore, the VLC unit with VLC transmitting unit may include an illuminant and/or is connected to an illuminant configured for transmitting the light signal. Alternatively or additionally, the VLC unit with VLC transmitting unit may include at least one illuminant driver that controls or switches the illuminant. The illuminant may include e.g. one light emitting diode (LED) and/or else a plurality thereof, arranged at the object or the effect luminaire. An LED can be present in the form of at least one individually packaged LED or in the form of a micro-LED or a Nano-LED (smart dust). A plurality of LED chips can be mounted on a common substrate (submount) and form an LED or can be secured individually or jointly for example on a circuit board, e.g. by means of a chip on board process (CoB). Instead of or in addition to inorganic LEDs, for example on the basis of AlInGaN or InGaN or AlInGaP, generally organic LEDs, for example OLEDs such as polymer OLEDs, are also usable. The LEDs can be directly emissive or include a phosphor disposed in front. Alternatively, the light emitting component can be a laser diode or a laser diode arrangement with converter (phosphor).

The illuminant for transmitting the light signal can have the following properties. It can be rapidly switchable and modulatable, and also have a good communication range, that is to say that the light is perceptible over large ranges. In this case, the communication range can be divided into short range (1 to 5 meters), medium range (5 to 20 meters) and long range (starting from 20 meters to a few 100 meters). The illuminants can be chosen accordingly, that is to say a respective illuminant for a respective range. There is the possibility of the illuminant for transmitting the light signal being the respective effect luminaire or the effect luminaire at which a VLC unit including a VLC transmitting unit is arranged. The effect luminaire or the respective effect luminaire can utilize its emitted light, which otherwise irradiates the stage region, for transmitting light signals. There are various possibilities for utilizing the effect luminaire or the respective effect luminaire for transferring data sets. In this case, there is the possibility that all light sources of the effect luminaire or of the respective effect luminaire, which light sources are configured as illuminants for transmitting the light signal, are modulated synchronously, independently of the color or of whether they have laser light conversion. In other words, all light sources of the effect luminaire can flash or be modulated synchronously and thus transmit the light signal. There is also the possibility of utilizing only light sources which are not converted, that is to say that only light sources of the effect luminaires which do not have laser light conversion are utilized for transmitting the light signal. A further possibility is to utilize only light sources of a specific color. It is also possible to use exclusively light sources having a defined emission, this including a beam diameter and/or beam focusing and/or the interaction of primary and secondary optics. It is additionally possible to utilize only the light source(s) having the most intense emission, that is to say the light source(s) having the highest photon density. Moreover, there is the possibility of switching over or switching back and forth between light sources having different colors, and/or that different light sources having different colors emit other light signals. By utilizing different light sources having different colors, it is possible to increase the data transfer rate, that is to say that more information can be transferred in a shorter time. If two colors are utilized, for example, double the amount of information can be transmitted in the same time compared with one color. It may be provided, moreover, for only light sources of the effect luminaire or of the respective effect luminaire which are not involved in flashing effects and/or other highly dynamic luminous effects to be utilized as illuminants. The utilization of the effect luminaire or of the respective effect luminaire as illuminants has the effect that the latter can irradiate a large stage region, that is to say can have a high range. Moreover, there is no need to arrange any additional illuminant at the effect luminaire or the respective effect luminaire.

Furthermore, the illuminants and also the VLC unit with VLC transmitting unit can be suitable both for indoor applications and for outdoor applications, that is to say that the VLC unit with VLC transmitting unit can be sealed in a water-tight manner, for example. Furthermore, the VLC unit can be configured such that it can be used both in a bright environment and at night or in darkness. Depending on the utilization conditions of the VLC unit with VLC transmitting unit, the illuminants can be chosen and/or driven accordingly. By way of example, in a bright environment it is possible to choose an illuminant having a higher intensity compared with at night or in darkness.

The VLC unit with VLC receiving unit may have at least one optical sensor in order to receive the light signal transmitted by the illuminant or the respective illuminant by way of the respective VLC unit with VLC transmitting unit. The optical sensor can be for example a photodetector and/or a charge coupled device (CCD array) of a camera. Furthermore, the optical sensor can also be adapted to the ambient conditions and thus be used in bright surroundings and also in darkness and/or the optical sensor can be selected such that it is suitable for the environment in which the VLC unit with VLC receiving unit can be used. The optical sensor can be part of the sensor unit. Furthermore, the VLC unit may have an evaluation unit and/or is connected to an evaluation unit in order to decode and/or evaluate the light signal. If the VLC unit is fitted to the object or the respective object, for example, then it may be provided if said VLC unit additionally includes an energy store. If the VLC unit with VLC receiving unit is arranged at the effect luminaire or the respective effect luminaire, for example, then it may furthermore be provided that it includes a control unit and/or a data memory and/or is connected to a control unit and/or to a data memory. By means of the control unit, the light source of the effect luminaire can be controlled and/or the effect luminaire can be moved. If the VLC unit with VLC receiving unit is arranged at the object or the respective object, then it can also contain a control unit and/or be connected to a control unit, and thus control the controllable means, which for example is a motor for moving the object or the respective object and/or a light source, which is arranged at the object or the respective object and cannot be part of the VLC unit, and/or the communication unit, which can serve for communication with a person, for example. The data memory makes it possible that a program sequence can be stored. By way of example, a lighting sequence can be stored in the data memory and a show can thus be instituted. Furthermore, it is possible for the VLC unit with VLC receiving unit to be sealed against moisture. The VLC unit can thus be employed in the outdoor sphere, for example.

In various embodiments, the effect luminaire or the respective effect luminaire includes a movable luminaire head, moving head, which is pivotable in all spatial directions, for example by a servomotor. In other words, the principal optical axis of the effect luminaire or of the respective effect luminaire is pivotable in a plurality of or all spatial directions. Furthermore, it may be provided that the effect luminaire or the respective effect luminaire is arranged in a linearly movable manner on a rail, for example. A large region can thus be illuminated by the effect luminaire or the respective effect luminaire. In other words, the object or the respective object or a plurality of objects can for example move across the stage and be illuminated over the complete distance by the effect luminaire or the respective effect luminaire. Furthermore, the effect luminaire or the respective effect luminaire may include at least one light source, which can emit light in different colors and/or can be dimmable, that is to say emits light with varying intensity. Furthermore, the effect luminaire is preferably able to form light spots and/or else patterns and/or to pulsate and/or flash and/or to adapt a beam diameter and/or spot diameter and/or beam focusing and/or optics. It is also possible to alter a graphical optical blackout setting (Gobo setting). That is to say that the effect luminaire can project patterns and/or lettering for example. In this case, different light effects can thus be implemented by the effect luminaire or the respective effect luminaire or a portion of the effect luminaires. Said light effects can be controlled by the control unit of the respective VLC unit and/or else be stored in the data memory. A program sequence stored in the data memory can be activated by means of state information received by the VLC unit of the effect luminaire or of the respective effect luminaire or by means of a received control signal.

In various embodiments, the effect luminaire or the respective effect luminaire or a portion of the effect luminaires can be arranged at a drone. This may be provided since the effect luminaire or the respective effect luminaire or a portion of the effect luminaires is/are thus movable, e.g. in all spatial directions, e.g. freely, in the space to be illuminated.

The respective object or a portion of the objects or the object at which the VLC unit or the respective VLC unit is arranged can be movable in space, e.g. movable on an area. The respective object or a portion of the objects or the object can be for example a vehicle, which can be moved over the stage, and/or some other object, including e.g. a controllable means. The controllable element may be controlled by the control unit of the VLC unit with VLC receiving unit that is arranged at or connected to the object or the respective object. Alternatively or additionally, the object or the respective object can be for example a person who can move on the stage and/or can perform acrobatics by means of ropes secured to the stage ceiling. Alternatively or additionally, the respective object or the object may include at least one controllable light source. The light source, like the controllable element, too, can be controlled by the control unit of the VLC unit with VLC receiving unit and/or by the control unit connected to the VLC unit. Furthermore, said light source can be incorporated into a T-shirt and/or in some other textile and/or else be provided in a controllable headlight at a vehicle. An accessory such as, for example, a bracelet having at least one controllable light source can also be controlled by the control unit of the VLC unit with VLC receiving unit and/or by the control unit connected to the VLC unit. The controllable light source can emit light in different colors and/or else with varying intensity. Furthermore, the light source can pulsate and/or flash and/or else produce a luminous effect that is stored for example on the data memory, e.g. in the VLC unit, that is to say start a program sequence. Furthermore, various light sources can also be fitted to a textile and/or to an object, which light sources can be driven, e.g. differently. In other words, in a textile, for example, which is a T-shirt, for example, firstly the left side can light up and then the right side and/or firstly all blue light sources and then all red light sources. Many different luminous effects can thus be obtained. Furthermore, the object or the respective object can be a person, a member of the cast, a member of the audience, a car, a musical instrument or else some other item of stage equipment.

In order to be able to assign the data, e.g. the state information of the respective effect luminaire or of the respective object, the items of state information can be assigned to exactly one VLC unit by means of the encoding of the light signal. That is to say that the respective items of state information of the effect luminaire or of the respective effect luminaire or of a portion of the effect luminaires or of the object or of the respective object or of a portion of the objects can be exactly assigned. The assignment of the respective VLC units to the object or the respective object or a portion of the objects can take place for example at the beginning of a stage show. In this case, by way of example, the members of the audience can acquire an encoded VLC unit at the box office, or else a person on the stage can acquire an encoded VLC unit. That means, moreover, that the respective item of state information of the object or of the respective object that is transmitted from the VLC unit of the object or of the respective object to another VLC unit and is transmitted from the latter to a further third VLC unit is furthermore assignable exactly to the respective object. By way of example, identification codes can be utilized for this purpose. In this case, the control of, for example, the effect luminaire or the respective effect luminaire or at least one portion of the effect luminaires can be very precise and mix-ups cannot occur once two objects are close together. Alternatively or additionally, the effect luminaire or the respective effect luminaire can thus also illuminate a plurality of objects on the stage, e.g. successively. The VLC network makes it possible for the VLC unit of the effect luminaire or of the respective effect luminaire to exchange items of state information with, for example, the VLC unit of the respective object, said items of state information containing not only the items of state information of the respective object but also items of state information of other objects and/or effect luminaires. It is thus possible for a plurality of objects to be illuminated successively. The sequence can be effected as follows, for example. Firstly, the effect luminaire or the respective effect luminaire can illuminate the respective object. The respective VLC unit of the respective object can for example then transmit the items of state information, which can contain for example position data of an object alongside, to the VLC unit of the effect luminaire or of the respective effect luminaire. Since for example the position of the object alongside is thus known, the effect luminaire or the respective effect luminaires can then illuminate the object alongside. In other words, the assignment of the effect luminaire or of the respective effect luminaire to the object or to the respective object on the stage need not be rigid, rather the assignment can be altered as necessary. It is also possible that a plurality of objects and/or a plurality of effect luminaires can be combined to form a group, by means of the exact assignment by means of the identification codes. By means of the combination in groups, by way of example, a group of dancers on the stage can be illuminated, while a group next to them and/or a group standing between the first group are/is not illuminated. Furthermore, controllable light sources that are fitted to objects and are situated in a region can light up simultaneously since the VLC units which are arranged thereon and which control the light sources are identifiable by means of the identification code. The exact assignment of the state information to the object or to the respective object and/or to the effect luminaire or to the respective effect luminaire additionally makes it possible that a stage program not only can be traditionally sequence-based but also can be made temporally flexible and for example an effect can be triggered by the position of the object or of the respective object and/or of the effect luminaire or of the respective effect luminaire and the illumination of the object or of the respective object by the effect luminaire or the respective effect luminaire can be precise even in the event of an improvisation. By way of example, it can be possible that a goal during a game of soccer triggers lighting up of the effect luminaire or of at least one portion of the effect luminaires. To that end, by way of example, the sensor unit can be a light barrier at the goal, at which light barrier a VLC unit including a VLC transmitting unit is arranged and the latter provides the state information, which in this case represents the ball in the goal, to the VLC unit or the respective VLC unit of the effect luminaire or of at least one portion of the effect luminaires, which accordingly light(s) up/emit(s) light.

In this case, the light signal utilized for communication between the VLC units can be visible light, for example. In this case, the light signal can be transmitted by various LEDs that emit light with different colors. It is possible for different data sets to be transferred by means of different light colors. Consequently, a plurality of data sets can be transferred simultaneously and the data transfer rate becomes higher. Furthermore, the light signal can additionally or alternatively be transferred by UV light and/or else infrared light.

Furthermore, it may be provided that the light signal is modulated in such a way that it has a frequency of at least 60 hertz. The higher the frequency of the light signal, the higher the data transfer rate. Furthermore, starting from 60 hertz the human eye can no longer perceive the flashing of the illuminant that modulates the light signal. In various embodiments, it may be provided that the frequency of the light signal is greater than 500 hertz or greater than 1000 hertz. In this case, the flashing of the illuminant can no longer be perceived by a camera recording, by means of a smartphone or a television camera. Furthermore, a data transfer rate of up to 10 or 100 gigabytes per second can thus be achieved.

Furthermore, the illuminant of the or the respective VLC unit including a VLC transmitting unit and the optical sensor of the or the respective VLC unit including a VLC receiving unit can be aligned in such a way that they are optimized with regard to the transfer. In other words, the illuminant and the optical sensor can have a visual link, such that the optical sensor can receive the light signals of the illuminant. This can be a simple visual link or else for example a visual link by way of mirrors. Furthermore, in a network of VLC units, the data transfer can also be conducted via a plurality of different VLC units, and there is thus no need for a direct visual link between two VLC units that communicate with one another.

The items of state information that can be transferred by means of the data transfer between the VLC units can be for example the position data of the object or of the respective object and/or the position data and/or the orientation of the effect luminaire or of the respective effect luminaire in space and/or an operating state of a light source and/or else of various light sources arranged at the object and/or at the effect luminaire, and/or the operating state of a controllable element of the object. This can be for example movement data such as velocity and/or acceleration and/or rotation and/or tilting and/or a height, for example the distance from a stage floor, of the effect luminaire or of the respective effect luminaire or of the object or of the respective object. The operating state of a light source can be for example the color and/or the intensity and/or the pattern that the effect luminaire can form, pulsation and/or flashing rate and/or beam diameter and/or spot diameter and/or the frosting setting and/or the Gobo setting and/or the beam focusing and/or the setting of the optics. In this case, said items of state information can be detected by the sensor unit that is assigned to the VLC unit and/or is connected to a VLC unit.

In various embodiments, the position data of the respective object or of the object can be detected as state information in, e.g. two, different ways. In various embodiments, the sensor units that detect the position data are arranged at different positions, e.g. one sensor unit at the object and one sensor unit at a distance from the object. One or a further possibility is to determine the position of the object by means of a GPS transmitter assigned to the sensor unit of the VLC unit. The GPS sensor can be provided for example in the case of a smartphone and/or in the case of an acceleration sensor and/or a rotation sensor and/or a tilt sensor and/or in the case of a bracelet. Furthermore, the lighting system can furthermore include a position detection system, e.g. as second sensor unit, which is arranged at a distance from the object or the respective object. In order to determine position data, by way of example, the illuminant arranged at the VLC unit or connected to the VLC unit can be utilized. The illuminant can be recorded by an object distance measuring instrument and/or a stereo camera and/or a 3D camera, or a 3D camera system. A binary large object recognition (Blob recognition) that evaluates the detected images, for example those of the 3D camera, enables the optical and visual object detection. For example, the data can be evaluated by triangulation and the position of the object or of the respective object can thus be determined. The Blob recognition can detect regions of identical structure, which then define the object and/or a partial region of the object. A further possibility is additionally or alternatively to utilize a LiDAR system (Light Detection and Ranging system). This is a laser system that can determine the position of the object or of the respective object by means of the light reflected from the object. In other words, LiDAR systems emit laser pulses and detect the light backscattered from objects. From the light propagation time of the light that is emitted and radiated back, it is possible to calculate the distance to the scattering location, that is to say a point of the object. Further possibilities are moreover to determine the position by means of ultrasound and/or position marking systems such as, for example, an infrared laser network, or a laser network. If the position data are determined by two different sensor units, then for example the VLC unit that is arranged at one of the sensor units and/or is connected thereto can transmit the position data to the VLC unit that is arranged at the other sensor unit and/or is connected thereto. In various embodiments, for this purpose, the evaluation unit of the VLC unit has an option to compare the different data sets of the position data of the object with one another. Consequently, the visual link between the illuminant of the VLC unit with VLC transmitting unit of the object or of the respective object and the optical sensor of the VLC unit of the effect luminaire or of the respective effect luminaire, which sensor serves for detecting the light signal, can be briefly separated without the position of the object being unknown to the effect luminaire at this time. In other words, it may be provided that the lighting system includes a sensor unit for position determination at the object and a sensor unit for position determination of the object at a distance from the object in order to accurately determine the position of the object at every point in time, and the lighting system is thus more fail-safe.

In various embodiments, the movement of the object or of the respective object and/or the movement of the effect luminaire or of at least one portion of the effect luminaires and/or the state of the light source of the effect luminaire or of at least one portion of the effect luminaires and/or the controllable element of the object or of the respective object are/is controllable. That is to say that these features can be controlled by the control unit of the respective VLC unit and the operating state of the controllable element of the object or of the respective object and/or the operating state of the effect luminaire or of at least one portion of the effect luminaires can thus be altered depending on what state information and/or what command are/is transmitted by the VLC unit. Consequently, the control of the effect luminaire or of at least one portion of the effect luminaires and/or of the object or of the respective object is temporally flexible.

The method for transferring or for exchanging at least one item of state information between two VLC units arranged at and/or connected to the effect luminaire or the respective effect luminaire and the object or the respective object includes the following sequence. Firstly, the state information of the object or of the respective object and/or of the effect luminaire or of the respective effect luminaire can be detected by the sensor unit of a first VLC unit, which may include a VLC transmitting unit. The state information is then encoded with the identification code, such that it can be assigned to the object or to the respective object and/or to the effect luminaire or to the respective effect luminaire, and the state information is then modulated, such that it can be transmitted by the illuminant. The modulation and the encoding can be carried out for example by the controller of the VLC unit and/or by a controller connected to the VLC unit. The light signal is then transmitted by the illuminant via the VLC unit. In this case, the illuminant can be supervised and controlled by the illuminant driver. The light signal can then be received by a further, e.g. second, VLC unit. For this purpose, the VLC unit may include the optical sensor, which can be part of the sensor unit. Said sensor is assigned to the VLC unit with VLC receiving unit. The light signal can then be decoded by the evaluation unit in order that the state information and the identification code can be processed. This may be processed by the evaluation unit of the VLC unit.

After the decoding and/or the processing of the state information, the state information can be transmitted further by the further, e.g. second, VLC unit, which received the light signal, to a further, e.g. third, VLC unit. Furthermore, the received state information can not only be transmitted to the third VLC unit, rather the state information, e.g. with additional state information, can be transmitted back to the first VLC unit.

The additional state information that was transmitted to the first VLC unit can contain e.g. the position of the object or of the respective object that was detected by that sensor unit for determining the position of the object which is arranged at a distance from the object. If the first VLC unit is arranged at the object or the respective object and if it includes a sensor unit for position determination, for example a GPS sensor, then the first VLC unit has two differently determined items of position data of the object. That is to say that once the state information, that is to say the position data, and the additional state information have been transmitted back to the VLC unit, the evaluation unit of the VLC unit can compare the position data with one another and evaluate them.

Alternatively or additionally, depending on the state information acquired by the VLC unit, the operating states of the effect luminaire or of the respective effect luminaire can be changed and/or the controllable element of the object can be driven. This includes for example the movement of the effect luminaire and/or the flashing of light sources, or else the color change of light sources. In other words, the object or the respective object and/or the effect luminaire or the respective effect luminaire or at least one portion of the effect luminaires can be driven with regard to the state information and the emitted light signals are utilized as a control variable for luminous effects for the effect luminaire or the respective effect luminaire and/or the object or the respective object. These different steps make it possible that the temporal sequence of an event can be flexibly adapted. By way of example, depending on the size of the event site and depending on the position of the object or of the respective object, a different intensity of the effect luminaire or of at least one portion of the effect luminaires may be necessary in order to irradiate the object, such that a desired contrast is achieved in comparison with the other illumination in this region. This can be defined for example after the beginning of a show. Furthermore, it is possible, in the case of a sporting event, for example, to illuminate different sportspersons with different light colors and/or different effect luminaires and/or to change the color when a sportsperson is in the lead. In this regard, by way of example, the sportsperson in the lead can always be lit up red. Furthermore, it is possible for a member of the cast in a region of the stage always to be lit up green by the effect luminaire or the respective effect luminaire or at least one portion of the effect luminaires and/or for said member of the cast to wear a textile having light sources which lights up green in said region. Furthermore, a luminous sequence can also be triggered for example when a singer on the stage walks into a specific position. It is additionally possible to illuminate a single object in an arranged or concentrated action by a plurality of effect luminaires. A coordinated illumination, for example both light up green, between a controllable light source of the respective object and the effect luminaire or at least one portion of the effect luminaires is also possible.

Various embodiments provide a lighting system which is controllable in a simple and cost-effective manner in terms of device technology and may eliminate one or more of the disadvantages from the prior art. Furthermore, various embodiments provide a control method which may eliminates one or more of the disadvantages from the prior art.

Figure 1:
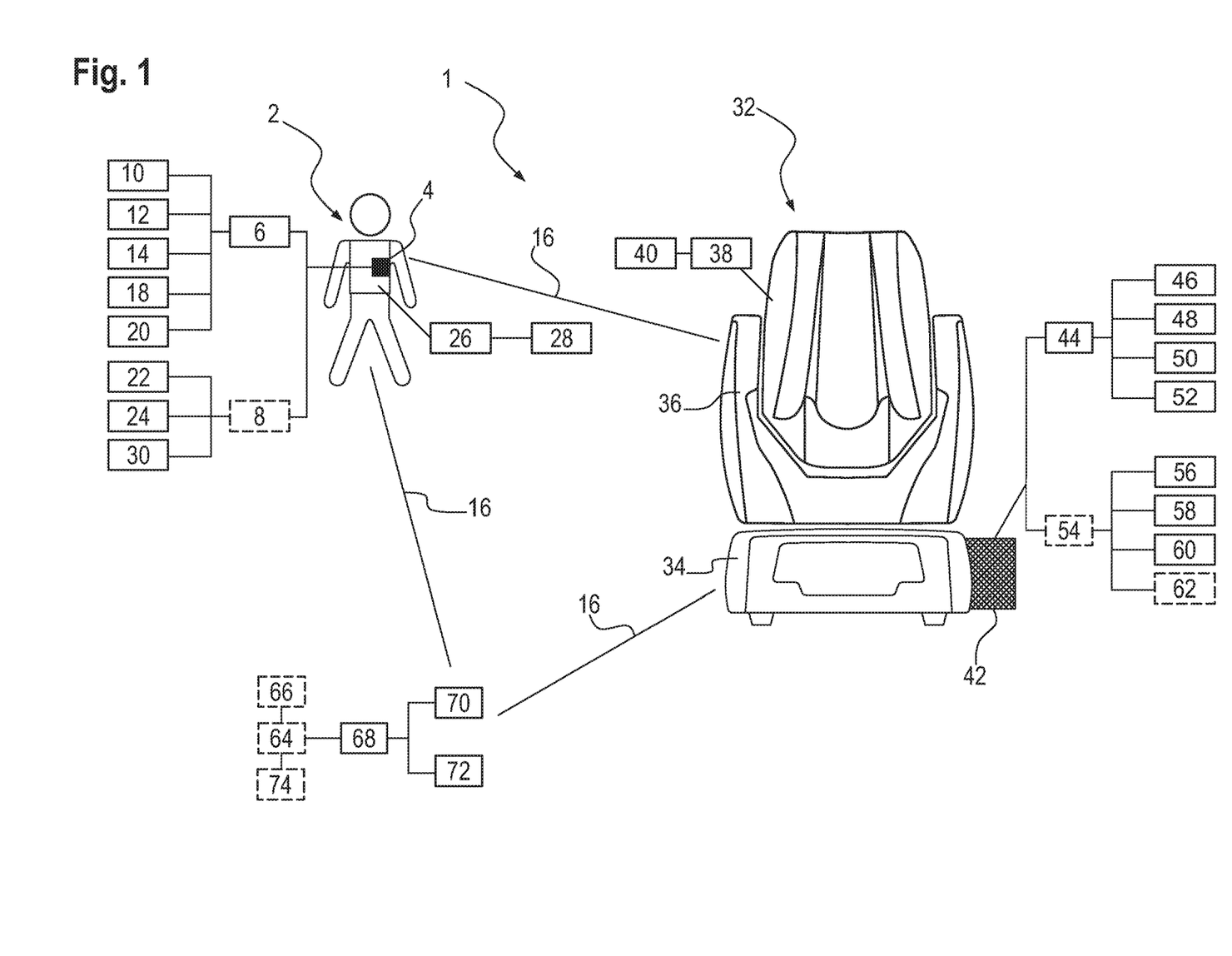
FIG. 1 shows a lighting system including a person and an effect luminaire.

FIG. 1 shows a lighting system 1 including a person 2, as a movable object. A VLC unit 4 is arranged on the person 2. Said VLC unit has a VLC transmitting unit 6 and can optionally also include a VLC receiving unit 8. Furthermore, the VLC unit 4 includes a sensor unit 10 configured for detecting items of state information, for example for detecting position data of the person 2. The VLC unit 4 additionally includes an energy store 12 and an illuminant 14 serving for transmitting a light signal 16. The light signal 16 is illustrated schematically as a line. For modulating and for decoding an item of state information into a light signal 16, the VLC unit 4 includes a controller 18. The latter forwards the modulated and encoded signal to the illuminant driver 20, which switches the illuminant 14, such that the latter emits the light signal 16.

If the VLC unit 4 additionally has the VLC receiving unit 8, then the latter may include an optical sensor 22, for receiving a light signal 16. For decoding and evaluating the light signal 16, the VLC receiving unit 8 additionally includes an evaluation unit 24.

The person 2, in addition to the VLC unit 4, can have a controllable means, for example a luminous textile 26, into which for example the illuminant 14 and/or controllable light sources 28 are/is incorporated. The controllable light sources 28 can be controlled by the VLC unit 4, for example, such that they light up for example as necessary. For controlling the controllable means, that is to say the light sources 28 and/or the illuminant 14, the VLC receiving unit 8 additionally includes a control unit 30.

The lighting system 1 additionally includes an effect luminaire 32, which can illuminate for example the person 2 on a stage. The effect luminaire 32 has a base 34, on which is arranged an arm 36, which is rotatable about a vertical axis and which extends in a forked fashion around a luminaire head 38 having at least one light source 40. The effect luminaire 32 likewise includes a VLC unit 42. The latter has a VLC receiving unit 44 having an optical sensor 46, an evaluation unit 48 and a control unit 50, for controlling the light source 40, the rotatable arm 36 and the luminaire head 38. The VLC receiving unit 44 can additionally include a data memory 52, which can store for example a program sequence for controlling the effect luminaire 32. The VLC unit 42 can additionally include a VLC transmitting unit 54. The latter includes a sensor unit 56, for example a LiDAR system, for detecting items of state information, which are for example position data of the person 2. The VLC transmitting unit 54 additionally has a controller 58 and an illuminant driver 60. If the VLC unit 42 includes a VLC transmitting unit 54, then the VLC transmitting unit can additionally include an illuminant 62 for transmitting the light signal 16 or the effect luminaire can emit the light signal 16 by means of its light source 40.

The lighting system can additionally include at least one external unit 64. The latter may include for example a sensor unit 66 serving for detecting items of state information, for example for detecting the position of the person 2. For communication with the VLC unit 42 of the effect luminaire 32 and/or the VLC unit 4 of the person 2, the external unit 64 additionally includes a VLC unit 68, which likewise can have a VLC transmitting unit 70 and/or a VLC receiving unit 72 and can receive and/or transmit light signals 16. The external unit 64 can additionally include an operating device 74 configured for external operation, by a person, for example. The commands can likewise be transmitted by way of the light signals 16.

The sequence of the exchange of items of state information between the VLC units 4, 42, 68 can proceed as follows, for example. The sensor unit 10 can detect the position data of the person 2. This state information is encoded and modulated by the controller 18. The decoded light signal 16 is transmitted by way of the driving of the light source 14 by the illuminant driver 20. Said light signal can for example be received by the optical sensor 46 of the effect luminaire 32 and be decoded and evaluated by the evaluation unit 48. The effect luminaire 32 is then controlled by the control unit 50 in such a way that the person 2 is illuminated. This state information, stating that the principal optical axis of the effect luminaire 32 is aligned with the person 2, could conversely then be transmitted to the VLC unit 4 of the person 2. The control unit 30 thereof could then drive the controllable light sources 28 of the luminous textile 26, such that they emit light for example in the same color as the effect luminaire 32.

Figure 2A:
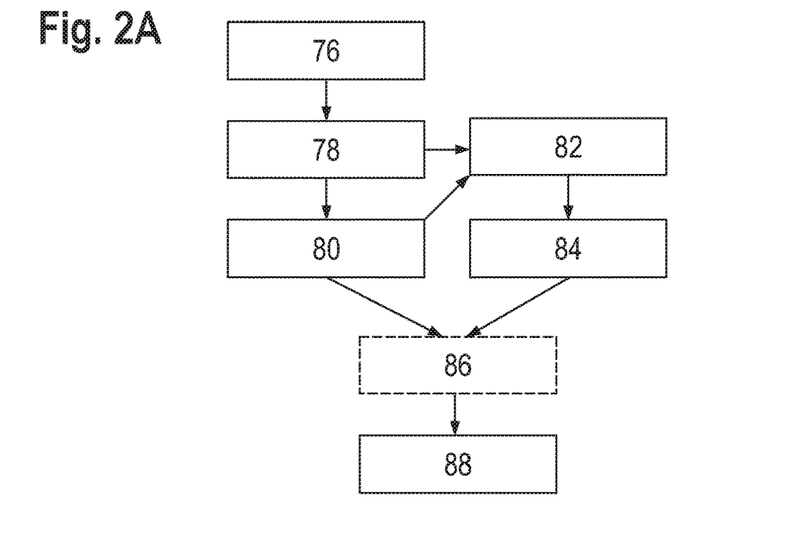
FIGS. 2A and 2B show each show a flow diagram of a method.

The method for controlling the lighting system 1, described in FIG. 2a, begins with step 76, in which the position data of the object 2, which is the person, for example, are determined as state information. Optionally and/or additionally, at least one further item of state information can be determined by the sensor unit 10 of the first VLC unit 4 arranged at the object 2; see also FIG. 1. In step 78, the state information is transmitted by way of an identification-encoded, modulated light signal 16 by means of the illuminant 14 of the first VLC unit 4. In step 80, a further, second VLC unit 42 arranged at an effect luminaire 32 receives the light signal 16 via the optical sensor 22 and decodes the light signal 16 in order to obtain the state information. In step 82, which can be carried out as an alternative or in addition to step 80, other further, third VLC units, for example the VLC unit 68 of the external unit 64, receive the light signal 16 of the VLC unit of the object 2 and transmit it further. In step 84, which takes place after step 82, the second VLC unit 42 receives the state information which was transmitted by the other, third VLC units 68, and decodes the light signal in order to obtain the state information. In step 86, which is an optional step, the position data of the object 2 are detected by the sensor unit 56 of the effect luminaire 32 and the evaluation unit 48 of the second VLC unit 42 compares the ascertained position data of the first sensor unit 10 with the ascertained position data of the second sensor unit 56. In step 88, the effect luminaire 32 is controlled by the control unit 50 of the second VLC unit 42 such that it follows the object 2 and illuminates the latter. Alternatively or additionally, the control unit 50 controls the effect luminaire 32 depending on at least one further item of state information, such that for example the emitted color of the effect luminaire 32 changes.

Figure 2B:
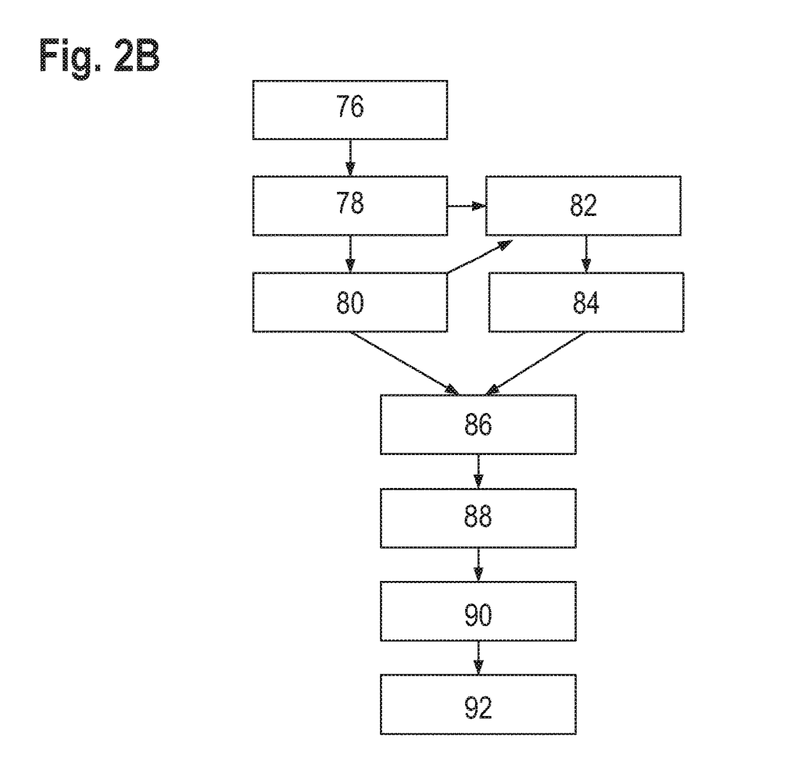

FIG. 2b shows a flow diagram that differs from the flow diagram in FIG. 2a with regard to step 86, since step 86 is not optional in the flow diagram in FIG. 2b, but rather is carried out. Furthermore, two additional steps 90 and 92 are also carried out. In step 90, items of state information of the effect luminaire 32 which were determined by the sensor unit 56 of the second VLC unit 42 are transmitted to the first VLC unit 4 arranged at the object 2 and are processed by the first VLC unit 4. Afterward, in step 92, the controllable element of the object 2 is driven by the first VLC unit 4 and the effect luminaire 32 is driven by the second VLC unit 42 such that location-dependent luminous effects and/or location-independent luminous effects and/or luminous effects coordinated with one another by the items of state information arise.

Lighting system including at least two VLC units and an effect luminaire, wherein one VLC unit is connected to the effect luminaire and/or is arranged at the latter, and the other VLC unit is arrangeable at an object. The VLC units exchange items of state information with one another, either unidirectionally or multidirectionally. Furthermore, the effect luminaire and/or the object can be controllable depending on the state information.

LIST OF REFERENCE SIGNALS

| Lighting system | 1 |
|---|---|
| Person | 2 |
| VLC unit | 4, 42, 68 |
| VLC transmitting unit | 6, 54, 70 |
| VLC receiving unit | 8, 44, 72 |
| Sensor unit | 10, 56, 66 |
| Energy store | 12 |
| Illuminant | 14, 62 |
| Light signal | 16 |
| Controller | 18, 58 |
| Illuminant driver | 20, 60 |
| Optical sensor | 22, 46 |
| Evaluation unit | 24, 48 |
| Luminous textile | 26 |
| Light source | 28, 40 |
| Control unit | 30, 50 |
| Effect luminaire | 32 |
| Base | 34 |
| Rotatable arm | 36 |
| Luminaire head | 38 |
| Data memory | 52 |
| External unit | 64 |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting system, comprising:
   at least two visual light communication units (VLC units);
   at least one effect luminaire, at which one of the VLC units is provided,
   wherein a further VLC unit is arrangeable at an object,
   wherein at least one item of state information of at least one of the object or the effect luminaire is transferable between the VLC units by at least one light signal,
   wherein the state information is at least one of a position data of the object or an operating state of a controllable element of the object or a position data of the effect luminaire or an orientation of the effect luminaire in space or an operating state of one or more controllable light sources; and
   an evaluation unit configured to correlate a detected position data of the object detected by one of at least two sensor units with a detected position data of the object detected by another of the at least two sensor units.

2. The lighting system of claim 1,
   wherein the VLC unit comprises at least one of a VLC transmitting unit or a VLC receiving unit.

3. The lighting system of claim 2,
   wherein the VLC transmitting unit comprises at least one of:
      at least one sensor unit configured to detect the state information;
      at least one controller configured to encode or to modulate the at least one light signal; or
      at least one energy store or at least one illuminant.

4. The lighting system of claim 2,
   wherein the VLC receiving unit comprises at least one of:
      at least one optical sensor configured to receive the at least one light signal;
      the evaluation unit further configured to decode the at least one light signal for evaluating the at least one light signal; or
      at least one energy store.

5. The lighting system of claim 4,
   wherein an illuminant of the VLC transmitting unit and the optical sensor are aligned such that they are aligned in an optimized manner with regard to the transfer.

6. The lighting system of claim 1,
   wherein a respective VLC unit is assignable to at least one of a plurality of objects or a plurality of effect luminaires;
   wherein the state information is assignable in each case to exactly one VLC unit as a result of an encoding of the at least one light signal.

7. The lighting system of claim 1,
   wherein the at least one light signal has a frequency of at least 60 Hz.

8. The lighting system of claim 1,
   wherein at least one of a principal optical axis of the effect luminaire is pivotable in a plurality of or all spatial directions or the effect luminaire is arranged in a linearly movable manner on a rail and/or comprises at least one controllable light source.

9. The lighting system of claim 1,
   at least one of:
      the object is movable in space;
      the object is movable on an area; or
      the object has at least one controllable element.

10. The lighting system of claim 1, wherein the correlation by the evaluation unit of the detected position data of the object detected by the one of the at least two sensor units with the detected position data of the object detected by the other of the at least two sensor units provides the position data of the object.

11. A method for transferring or for exchanging at least one item of state information from at least one of at least one object or at least one effect luminaire of a lighting system, the lighting system comprising:
   at least two visual light communication units (VLC units);
   at least one effect luminaire, at which one of the VLC units is provided,
   wherein the further VLC unit is arrangeable at an object,
   wherein at least one item of state information of at least one of the object or the effect luminaire is transferable between the VLC units by at least one light signal,
   wherein the state information is at least one of a position data of the object or an operating state of a controllable element of the object or a position data of the effect luminaire or an orientation of the effect luminaire in space or an operating state of one or more controllable light sources; and
   an evaluation unit configured to correlate a detected position data of the object detected by one of at least two sensor units with a detected position data of the object detected by another of the at least two sensor units, the method comprising:
- detecting the state information of at least one of the object or of the effect luminaire;
- at least one of modulating or encoding the items of state information into a light signal;
- transmitting or emitting the light signal by a first VLC unit;
- receiving the light signal by a second VLC unit; and
- at least one of decoding or processing the state information.

12. The method of claim 11,
wherein the method comprises, after the at least one of decoding or processing the state information, transmitting the state information to at least one of the second VLC unit or at least one further VLC unit.

13. The method of claim 11,
wherein the method comprises, at least one of
- after the at least one of decoding or processing the state information, or transmitting the state information to the second VLC unit or a further VLC unit, controlling at least one of the effect luminaire or the controllable element of the object or the effect luminaire depending on the state information.

* * * * *